(12) United States Patent
Rosian et al.

(10) Patent No.: US 12,457,667 B2
(45) Date of Patent: Oct. 28, 2025

(54) IMMERSION CIRCULATOR COOKING DEVICES

(71) Applicant: BREVILLE PTY LIMITED, Alexandria (AU)

(72) Inventors: Marian Silviu Rosian, Alexandria (AU); Tibor Hegedis, Alexandria (AU); Lichan Meng, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 952 days.

(21) Appl. No.: 17/416,504

(22) PCT Filed: Dec. 19, 2019

(86) PCT No.: PCT/AU2019/051402
§ 371 (c)(1),
(2) Date: Jun. 20, 2021

(87) PCT Pub. No.: WO2020/124150
PCT Pub. Date: Jun. 25, 2020

(65) Prior Publication Data
US 2022/0086960 A1    Mar. 17, 2022

(30) Foreign Application Priority Data
Dec. 19, 2018    (AU) ................. 2018904825

(51) Int. Cl.
*B23K 3/08*        (2006.01)
*A23L 5/10*        (2016.01)
(Continued)

(52) U.S. Cl.
CPC .................. *H05B 3/82* (2013.01); *A23L 5/13* (2016.08); *A47J 27/10* (2013.01); *A47J 36/32* (2013.01);
(Continued)

(58) Field of Classification Search
CPC ...... H05B 1/0266; H05B 3/80; H05B 1/0269; H05B 3/82; H05B 2203/019;
(Continued)

(56) References Cited

U.S. PATENT DOCUMENTS 5,099,409 A * 3/1992 Bando ................. H02M 7/1623
                                                              363/54
5,304,286 A * 4/1994 Palmer ...................... C02F 1/16
                                                              203/1
(Continued)

FOREIGN PATENT DOCUMENTS

AU    2015202982 A1 * 12/2015 ............. A21B 7/005
CN        201910659 U     7/2011
(Continued)

OTHER PUBLICATIONS

International Search Report mailed on Jan. 21, 2020 for International Application No. PCT/AU2019/051402.
(Continued)

*Primary Examiner* — Eric S Stapleton
(74) *Attorney, Agent, or Firm* — KDW FIRM PLLC

(57) ABSTRACT

An immersion circulator cooking device comprising: a motor for drawing fluid used for cooking past a heating element; a heating element for heating the fluid; a first switching device used in a first power mode for controlling the heating element; a second switching device used in a second power mode for controlling the heating element; a temperature sensor for sensing a sensed device temperature of the first switching device; and a controller for selecting which of the first power mode and second power mode is selected based on the sensed device temperature of the first switching device.

11 Claims, 14 Drawing Sheets

(51) Int. Cl.
*A47J 27/10* (2006.01)
*A47J 36/32* (2006.01)
*H05B 1/02* (2006.01)
*H05B 3/82* (2006.01)

(52) U.S. Cl.
CPC ......... *H05B 1/0266* (2013.01); *A47J 2202/00* (2013.01); *A47J 2203/00* (2013.01); *H05B 2203/021* (2013.01)

(58) Field of Classification Search
CPC ...... H05B 2203/021; A23L 5/13; A47J 36/32; A47J 27/10; A47J 2203/00; A47J 2202/00
USPC .......................................................... 219/523
See application file for complete search history.

(56) References Cited

U.S. PATENT DOCUMENTS

| | | | |
|---|---|---|---|
| 2012/0251695 A1* | 10/2012 | Neff | A47J 27/10 99/330 |
| 2013/0105002 A1* | 5/2013 | Enos | B01L 7/02 137/334 |
| 2013/0220143 A1 | 8/2013 | Fetterman et al. | |
| 2015/0150403 A1* | 6/2015 | Wu | A47J 27/10 99/344 |
| 2015/0245731 A1 | 9/2015 | Wu | |
| 2015/0342392 A1* | 12/2015 | Wu | H05B 6/1209 219/448.11 |
| 2016/0037956 A1* | 2/2016 | Wu | A47J 27/10 99/403 |
| 2016/0192801 A1* | 7/2016 | Wu | A47J 27/10 99/330 |
| 2017/0089768 A1 | 3/2017 | Wu et al. | |
| 2018/0296021 A1* | 10/2018 | Fetterman | A47J 27/10 |

FOREIGN PATENT DOCUMENTS

| | | | | |
|---|---|---|---|---|
| CN | 203225525 U | | 10/2013 | |
| CN | 106580053 A | | 4/2017 | |
| CN | 106724745 A | | 5/2017 | |
| CN | 106859286 A | | 6/2017 | |
| CN | 206620302 U | | 11/2017 | |
| CN | 111031865 A | * | 4/2020 | .............. A47J 27/10 |
| CN | 114025646 A | * | 2/2022 | .............. A23L 5/15 |
| EP | 2950610 A1 | | 12/2015 | |
| GB | 2487739 A | | 8/2012 | |
| WO | WO-2017066692 A1 | * | 4/2017 | .............. A47J 27/10 |

OTHER PUBLICATIONS

European Search Report and Written Opinion for the European Application No. EP19898416, mailed Aug. 11, 2022, 5 pages.

* cited by examiner

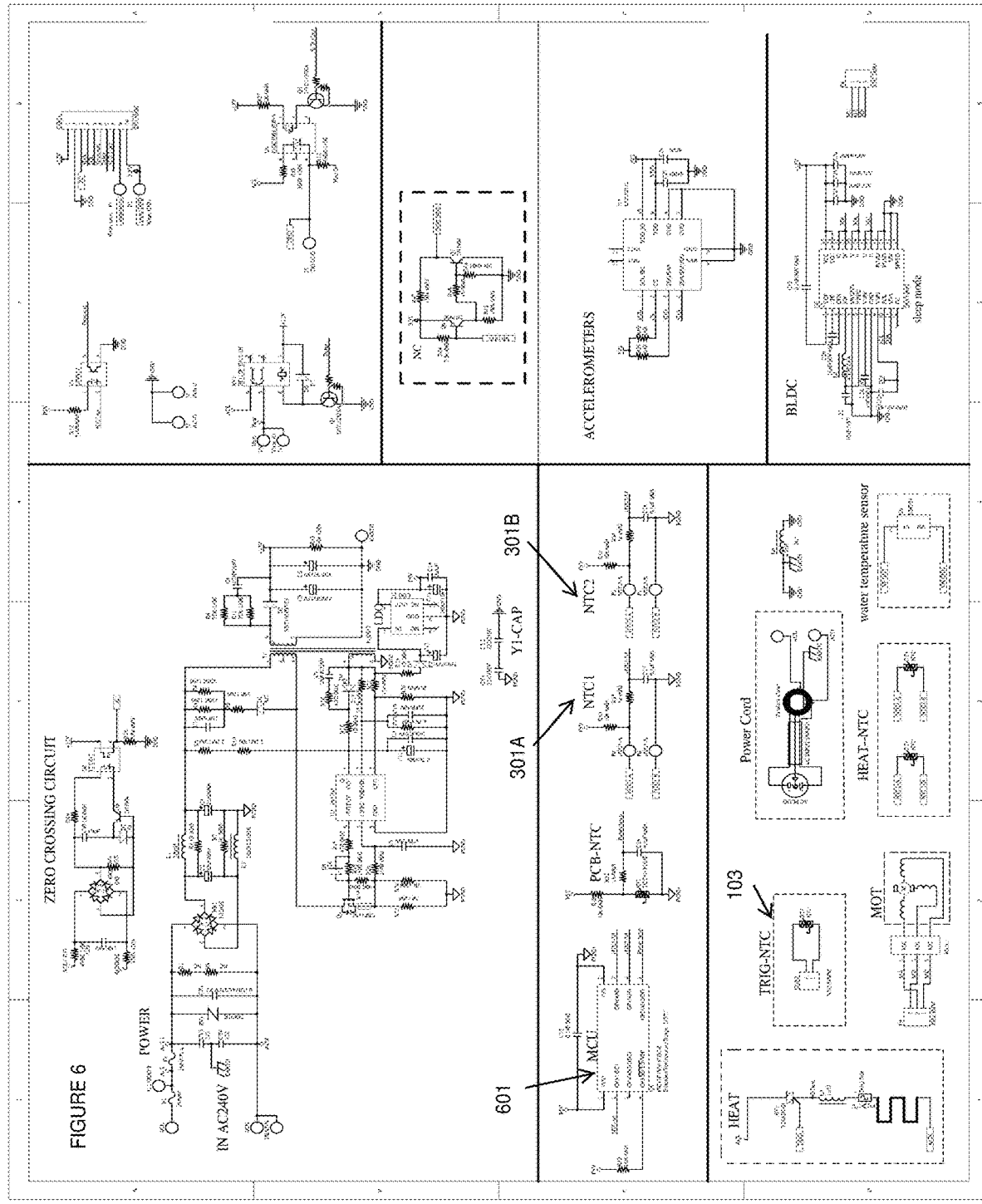

IMMERSION CIRCULATOR COOKING DEVICES

TECHNICAL FIELD

The present invention relates generally to improvements in immersion circulator cooking devices.

BACKGROUND

Immersion circulator cooking devices, also known as sous vides devices, cook food items in a volume of water in a bath by heating the volume of water at a controlled temperature by circulating the water through the device.

These types of cooking devices are complex electronically controlled devices that have electronic components that are prone to overheating if the device is left to operate in an improper manner. For example, the cooking device may be left to operate when there is little or no water in the bath. In this situation, there is a limited load on the heater inside the cooking device, which can result in the heater heating up very quickly resulting in the heater overheating and causing damage to the cooking device. Further, expensive food items being cooked in the cooking device may also be ruined if not being cooked correctly.

Other electronic components used for operating and/or controlling these types of cooking device include switching devices such as relays and triacs (i.e. triodes for alternating current). These switching devices are used to control the power being applied to the heater in the cooking device. These switching devices are placed in certain areas of the cooking device and get hot while the cooking device is being operated. The excess heat produced by these switching devices is undesirable.

Some systems shut down these types of cooking devices when an overheating situation is detected. Shutting down a cooking device during or following an overheating event can result in ruining the food that is being cooked by the cooking device.

SUMMARY

It is an object of the present invention to substantially overcome, or at least ameliorate, one or more disadvantages of existing arrangements.

Disclosed are arrangements which seek to address the above problems by controlling operation of these types of cooking device by operating when needed at different times during the operation function to balance and reduce the heat produced by these switching devices.

According to a first aspect of the present disclosure, there is provided an immersion circulator cooking device comprising: a motor for drawing fluid used for cooking past a heating element; a heating element for heating the fluid; a first switching device used in a first power mode for controlling the heating element; a second switching device used in a second power mode for controlling the heating element; a temperature sensor for sensing a sensed device temperature of the first switching device; and a controller for selecting which of the first power mode and second power mode is selected based on the sensed device temperature of the first switching device.

The first switching device may be a solid state switching device, such as, for example, a triac.

The second switching device may be a relay.

The sensed device temperature of the first switching device may be associated with one or more of an optimal fluid level, a minimal fluid level and a dry fluid level.

In the first power mode, the controller may be arranged to determine whether the sensed device temperature is below, or not above, a predetermined temperature level, and upon a negative determination, switch from the first power mode to the second power mode. The predetermined temperature level may be associated with a minimal fluid level.

In the first power mode, the controller may be arranged to determine whether the sensed device temperature is above a predetermined temperature level, and upon a positive determination, switch from the first power mode to the second power mode. The predetermined temperature level may be associated with a minimal fluid level.

In the second power mode, the controller may be arranged to determine whether a predetermined period of time has expired, and upon a positive determination, stop applying power to the heating element.

In the second mode of operation, the controller may be arranged to determine whether a button has been pressed that indicates fluid has been added, and upon a positive determination, switch from the second power mode back to the first power mode.

The cooking device may comprise a fluid temperature sensor for sensing sensed fluid temperature of the fluid, wherein the controller may be arranged to switch from the second power mode to the first power mode upon a determination that the sensed fluid temperature is above, or not below, a desired user set temperature, or the controller is arranged to switch from the first power mode to the second power mode upon a determination that the sensed fluid temperature is below, or not above, a desired user set temperature.

The cooking device may comprise one or more heater temperature sensors for sensing a sensed heater temperature, wherein in the first power mode, the controller may be arranged to determine whether the sensed heater temperature is either i) above a maximum temperature or ii) changing over time above a maximum temperature variation and, upon a positive determination, the controller may be arranged to switch off the heating element and generate an alarm. The maximum temperature may be associated with a dry fluid level. The maximum temperature variation may be associated with a dry fluid level.

The controller may be arranged to prime the fluid in the cooking device by operating the motor and detecting whether power used to operate the motor after the priming of the fluid is within range of a predetermined primed power level, and upon a negative determination, the control may be arranged to stop the motor and generate an alarm.

According to a further aspect, the present disclosure provides, a method of controlling an immersion circulator cooking device the method comprising the steps of: drawing fluid used for cooking past a heating element using a motor; heating the fluid by the heating element; controlling the heating element in a first power mode using a first switching device; controlling the heating element in a second power mode using a second switching device; sensing the device temperature of the first switching device using a temperature sensor; and selecting which of the first power mode and second power mode is selected using a controller based on the sensed device temperature of the first switching device.

The sensed device temperature of the first switching device may be associated with one or more of an optimal fluid level, a minimal fluid level and a dry fluid level.

In the first power mode, the method may comprise the steps of determining whether the sensed device temperature is below, or not above, a predetermined temperature level, and upon a negative determination, switching from the first power mode to the second power mode. The predetermined temperature level may be associated with a minimal fluid level.

In the first power mode, the method may further comprise the steps of determining whether the sensed device temperature is above a predetermined temperature level, and upon a positive determination, switching from the first power mode to the second power mode. The temperature level may be associated with a minimal fluid level.

In the second power mode, the method may further comprise the steps of determining whether a predetermined period of time has expired, and upon a positive determination, stopping the application of power to the heating element.

In the second mode of operation, the method may further comprise the steps of determining whether a button has been pressed that indicates fluid has been added, and upon a positive determination, switching from the second power mode back to the first power mode.

The method may further comprise the steps of switching from the second power mode to the first power mode upon a determination that the fluid temperature is above, or not below, a desired user set temperature, or switching from the first power mode to the second power mode upon a determination that the fluid temperature is below, or not above, a desired user set temperature.

In the first power mode, the method may further comprise the steps of determining whether a heater temperature is either i) above a maximum temperature or ii) changing over time above a maximum temperature variation and, upon a positive determination, the method may further comprise the step of switching off the heating element and generating an alarm. The maximum temperature may be associated with a dry fluid level. The maximum temperature variation may be associated with a dry fluid level.

The method may further comprise the steps of priming the fluid in the cooking device by operating the motor and detecting whether power used to operate the motor during the priming of the fluid is within range of a predetermined primed power level, and upon a negative determination, stopping the motor and generating an alarm Other aspects are also disclosed.

BRIEF DESCRIPTION OF THE DRAWINGS

At least one embodiment of the present invention will now be described with reference to the drawings and appendices, in which:

FIG. 6 shows a circuit diagram according to an embodiment of the present disclosure.

DETAILED DESCRIPTION INCLUDING BEST MODE

Figure 1:
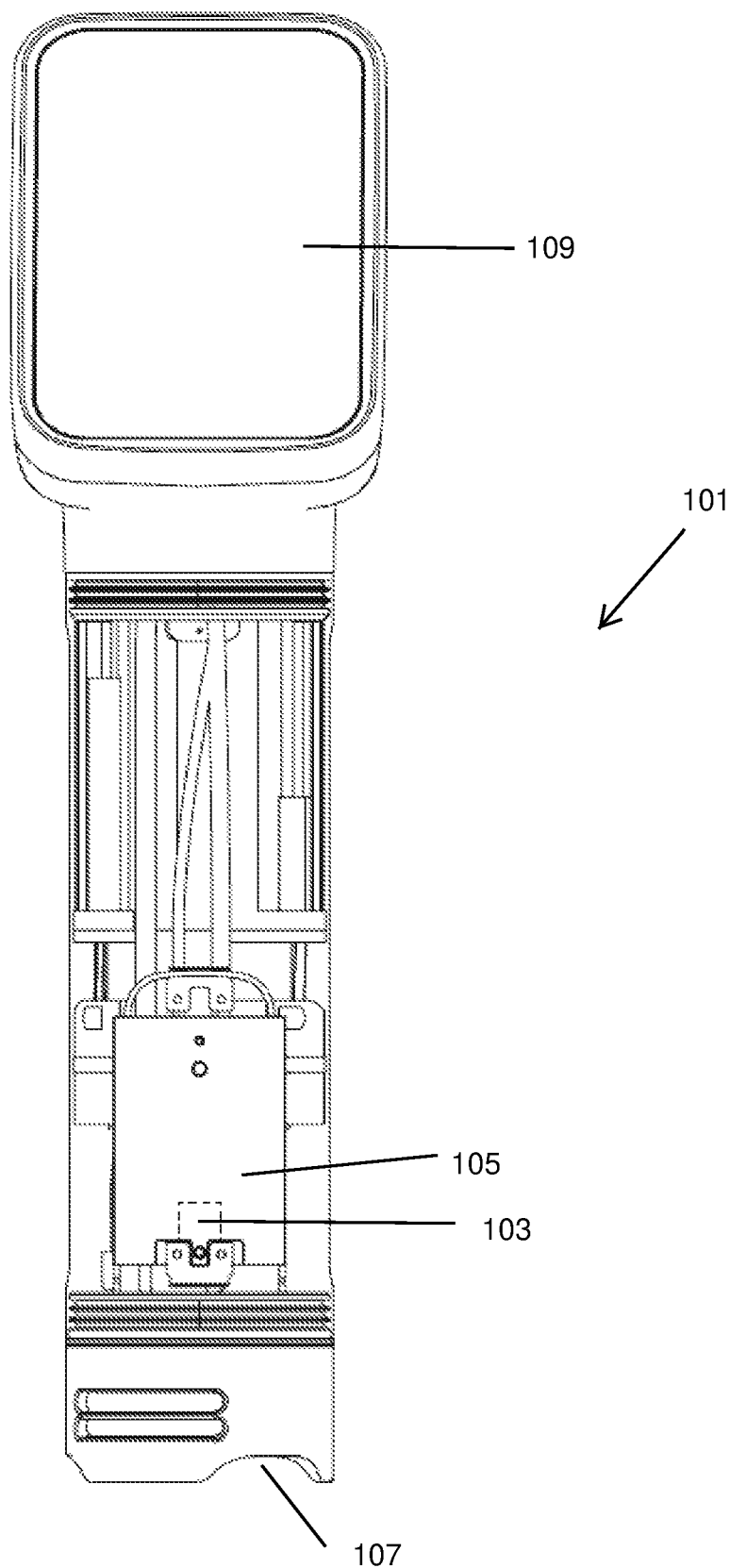
FIG. 1 shows an immersion circulator cooking device according to an embodiment of the present disclosure.

Where reference is made in any one or more of the accompanying drawings to steps and/or features, which have the same reference numerals, those steps and/or features have for the purposes of this description the same function(s) or operation(s), unless the contrary intention appears.

FIG. 1 shows an immersion circulator cooking device according to an embodiment of the present disclosure.

The immersion circulator cooking device 101 (or sous vides device) has a triac 103 that is used to control (in a normal cooking mode) switching of a heater element (not shown) that is used to heat a fluid (such as water) that enters the cooking device 1010 via a fluid inlet 107. A heatsink 105 is used to transfer heat generated by the triac during operation via the cylinder to the water. The cooking device 101 has a user interface 109 (e.g. a display) to enable users to control and operate the cooking device.

Immersion circulators are generally required to provide a highly stable cooking temperature environment for the cooking time of food stuffs to be accurate. This requires the power being applied to the heater to be switched on and off very quickly and often. This is carried out by using switching components. Conventional relays may control power, but are mechanical and may not withstand a high duty cycle. Therefore, it is preferable to use a triac (solid state semiconductor switching device) for switching power to the heater. However, a triac may get too hot sometimes, especially if the water level being used to cook the food drops too low. In this embodiment, a combination of a solid state semiconductor switching device (triac) and a relay are selectively switched by a controller.

As the triac is a solid state device, it does not suffer from wear and tear as mechanical devices do, and therefore switching cycles do not affect its lifespan.

The triac and heatsink are mounted onto the outer tube in such a way that the water in the bath is able to absorb the heat from the Triac. As the water level lowers inside the bath, the heatsink and the triac are no longer in as much thermal communication with the fluid and thus there is no longer an easy path for exchanging heat. Thus, an effect of this is that the triac is no longer cooled by the water in the bath and so the triac temperature rises. A triac NTC is used to monitor this temperature and control operation based on that triac temperature.

A relay 311 (see FIG. 3D) is also selectively used for continued operation of the device until the water bath is full and the triac can be cooled by that water.

Figure 2:
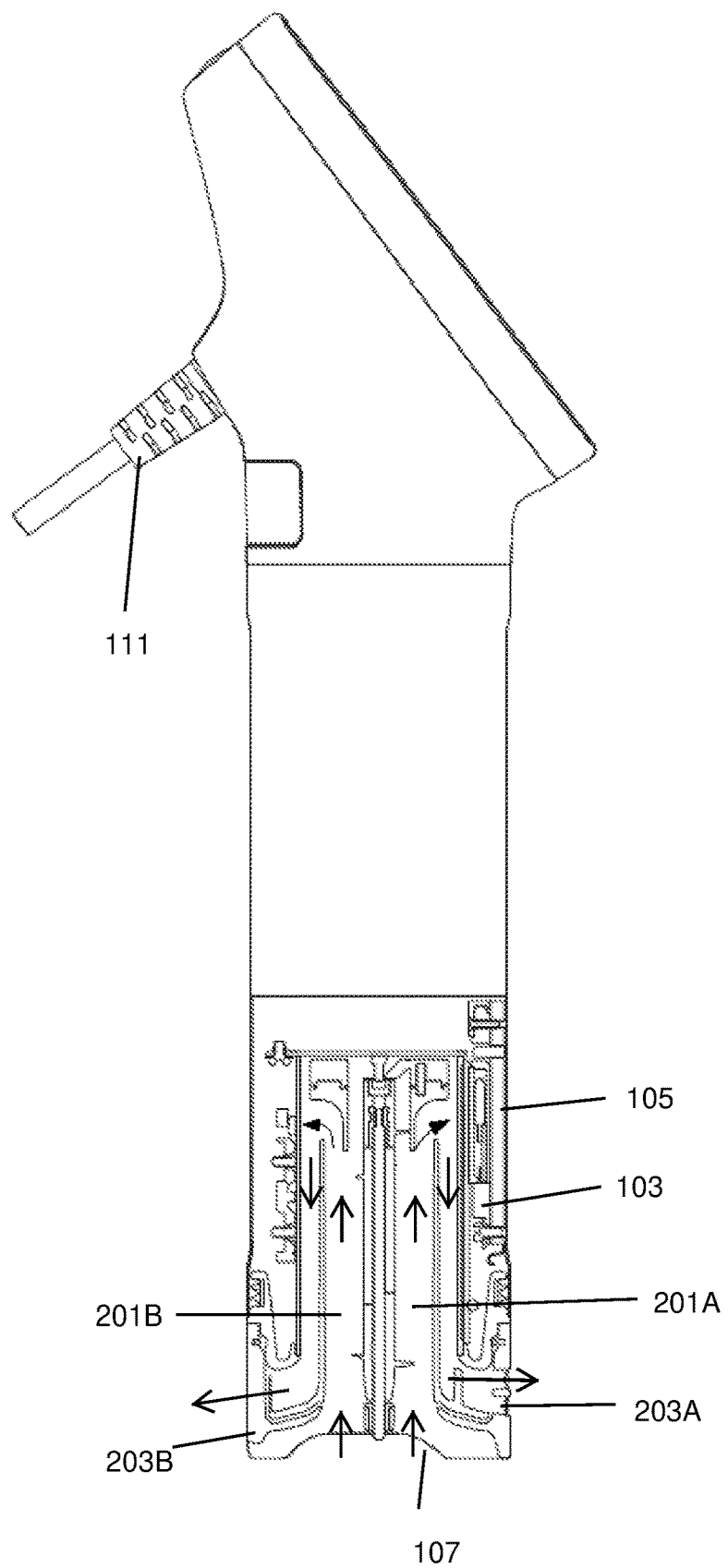
FIG. 2 shows an immersion circulator cooking device according to an embodiment of the present disclosure.

FIG. 2 shows an immersion circulator cooking device 101 according to an embodiment of the present disclosure. A power inlet 111 is provided to provide mains power to the device.

The fluid flow is shown wherein the fluid flows into fluid channels (201A, 201B) and out of fluid outlets (203A, 203B) where the fluid is heated via heating element that surrounds the fluid channels (201A, 201B).

FIGS. 3A to 3D show an immersion circulator cooking device in use according to an embodiment of the present disclosure. The components of the cooking device are within a hermetically sealed environment and so are not directly in contact with any fluid. They are shown in FIGS. 3A to 3D (and FIGS. 1 and 2) to provide the reader with a detailed internal view of the cooking device.

Figure 3A:
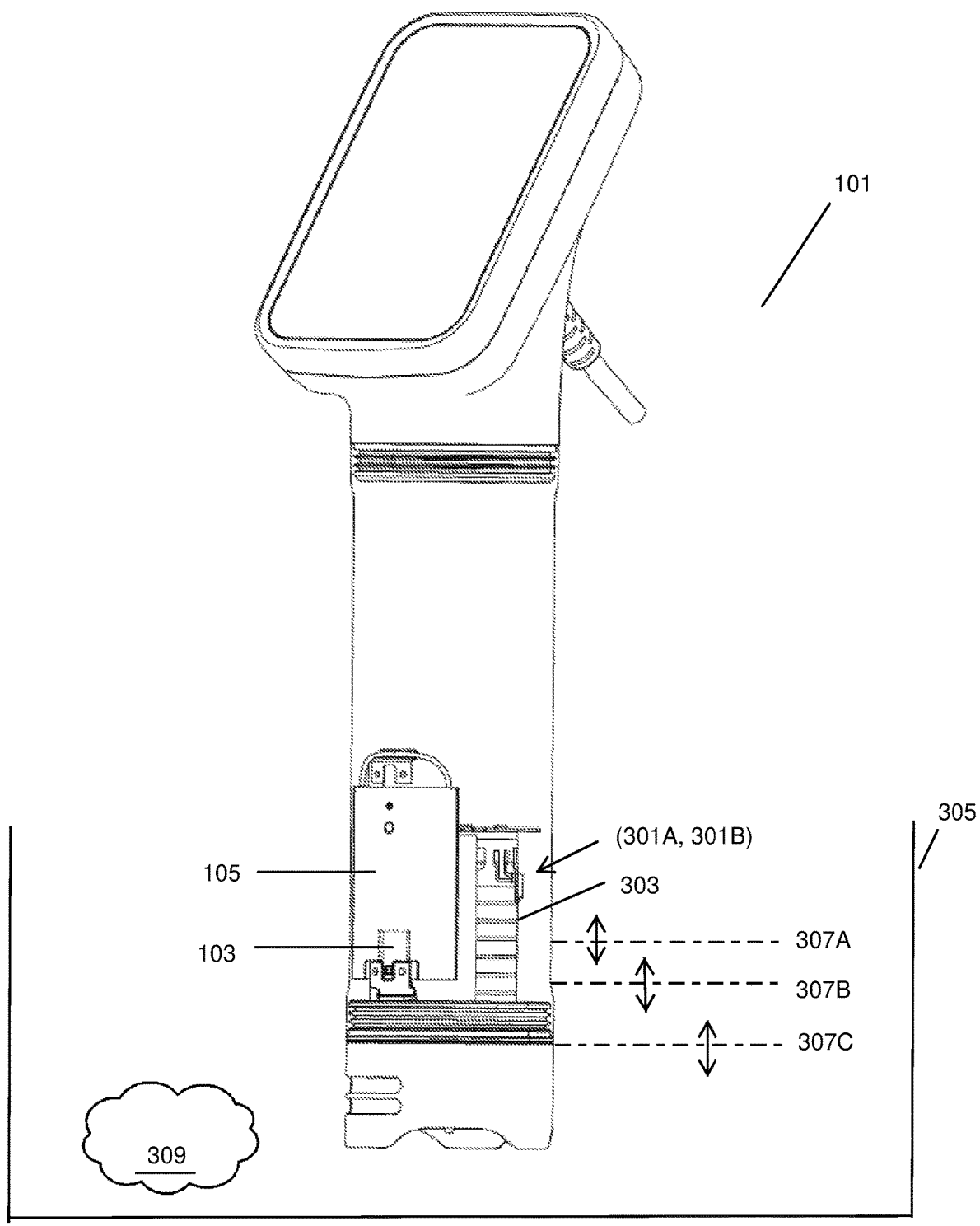
FIGS. 3A to 3D show an immersion circulator cooking device in use according to an embodiment of the present disclosure.
Figure 3B:
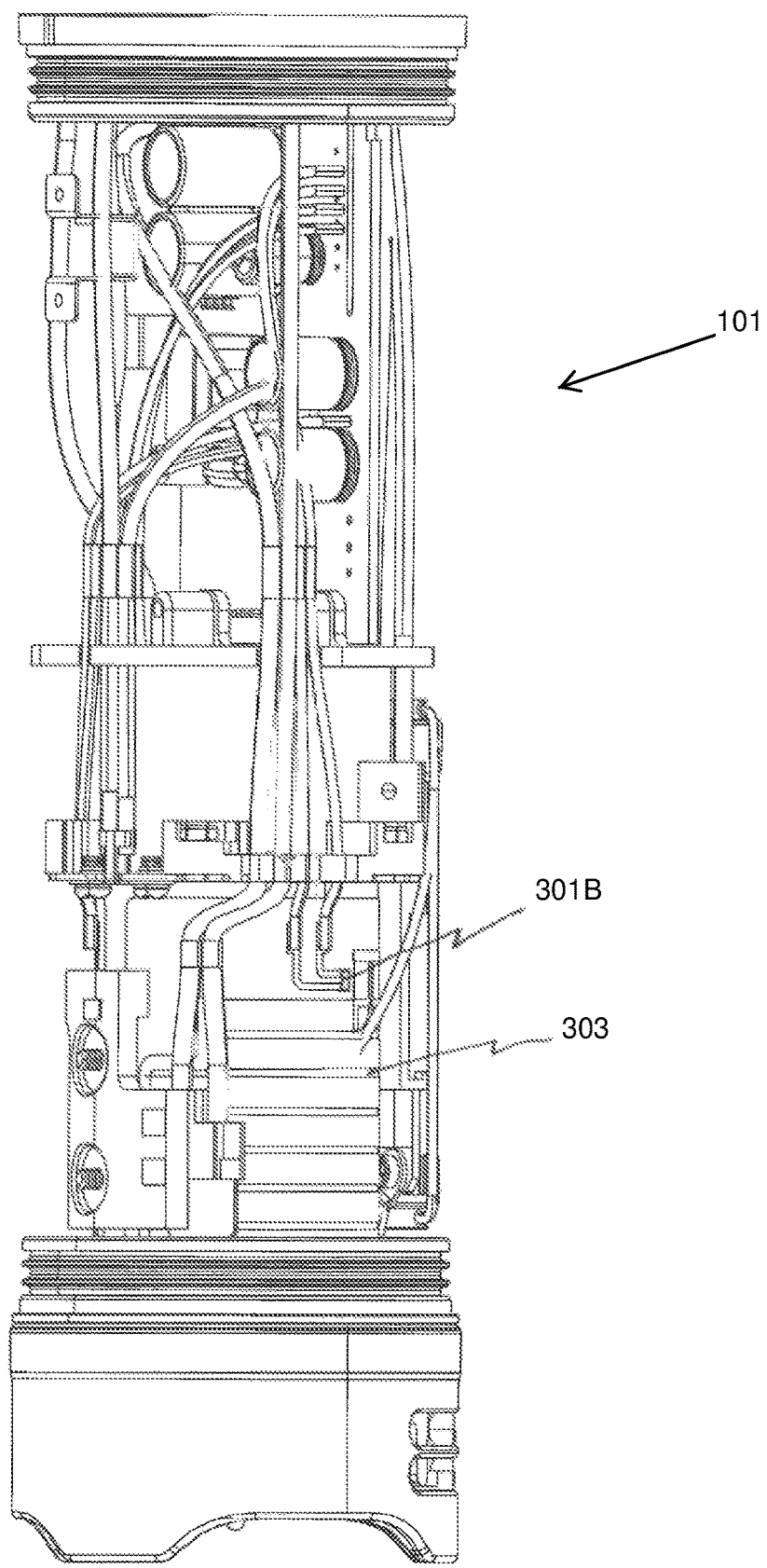
Figure 3C:
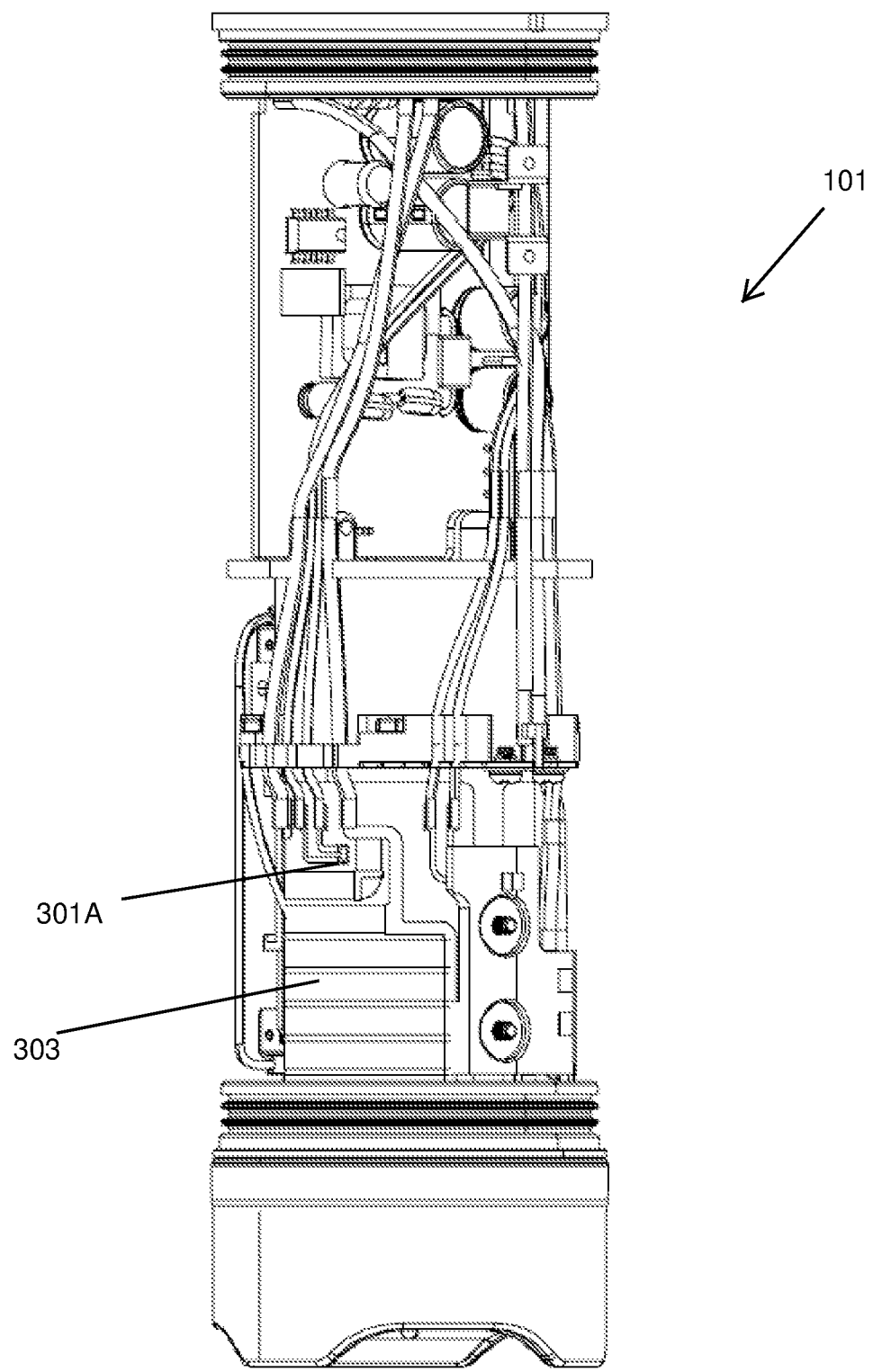
Figure 3D:
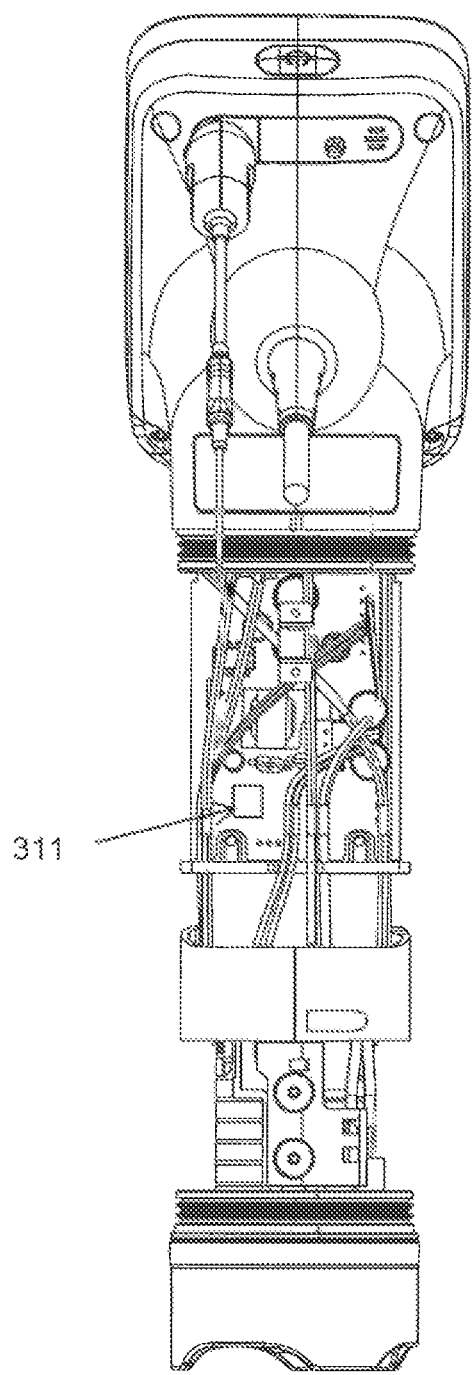

The cooking device 101 (in use) operates a heater element 303, the temperature of which is monitored by two heater NTCs (301A, 301B in FIGS. 3B & 3C). Two heater NTCs are provided for safety and redundancy purposes.

The cooking device 101 is placed in a bath 305 with a fluid (e.g. water) inside the bath. The fluid may be at different levels (307A, 307B, 307C) inside the bath. For example, an optimal fluid level 307A covers the food stuff 309 being cooked. The fluid level may change slightly over a period of time, but as long as the optimal level is within a defined range the food stuff should cook correctly. The optimal cooking level in this example is above the level of triac 103.

A minimal water level is indicated at 307B with the arrow indicating a range whether the water level is considered to be at a minimal level. Ideally, if the water level falls below this line, ideally the control mode of the device should be changed to cause a relay to act as the switching device (relay control mode) to switch power to the heater rather than the triac. If the water level falls above this line, then ideally, the control mode of the device should be changed to cause the triac to act as the switching device (triac control mode) to switch power to the heater.

A dry water level is indicated at 307C with the arrow indicating a range whether the water level is considered to be at a dry water level. At this level, the device is likely to be damaged and as such, as will be explained later, is controlled to display a message to the user to add water.

Figure 4A:
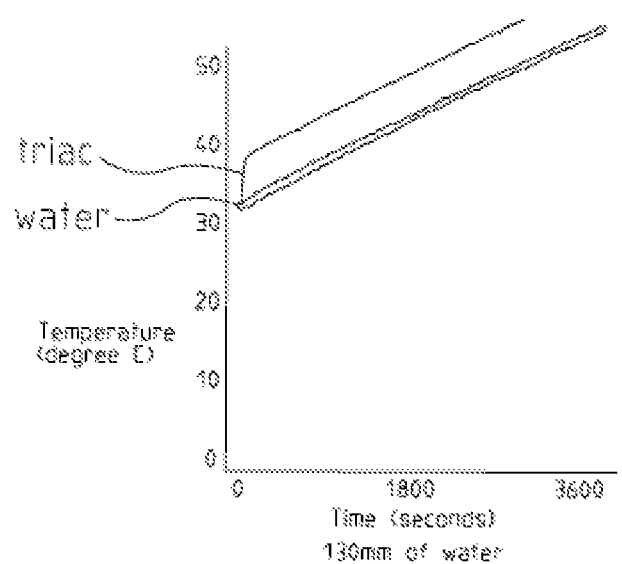
FIGS. 4A and 4B show temperature profile graphs according to an embodiment of the present disclosure.
Figure 4B:
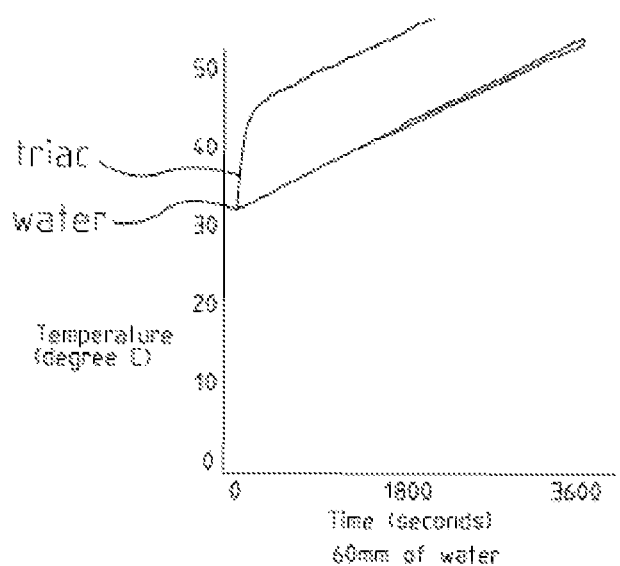
Figure 5A:
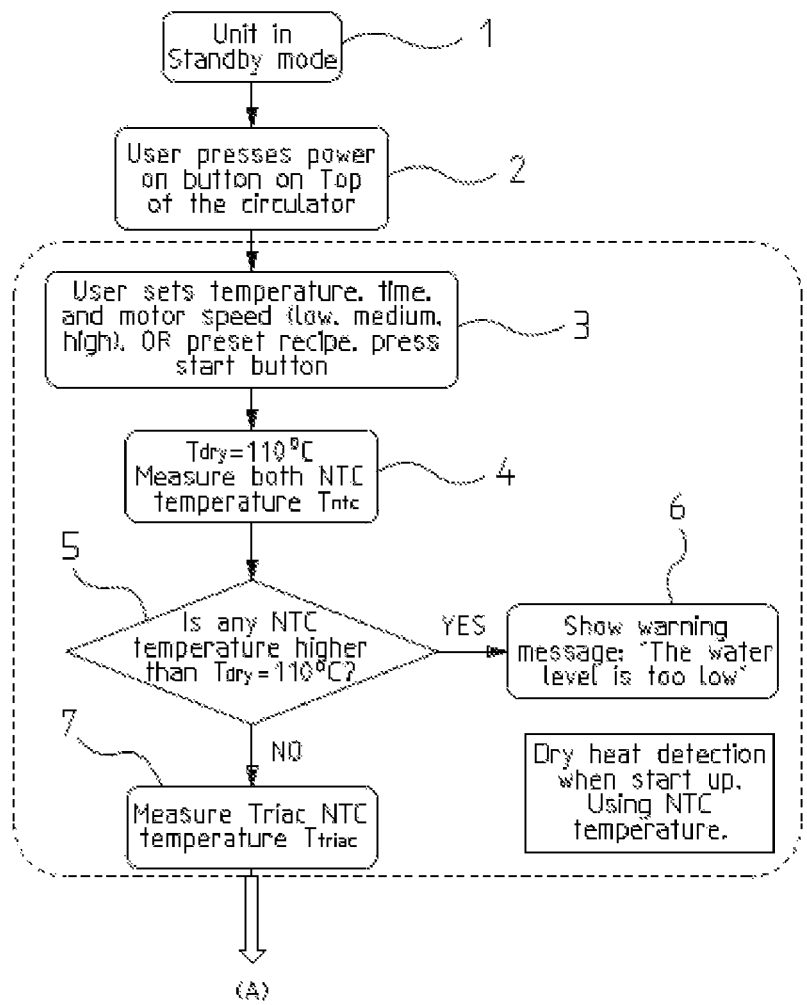
FIGS. 5A-5F show a process flow diagram for controlling an immersion circulator cooking device according to an embodiment of the present disclosure.
Figure 5B:
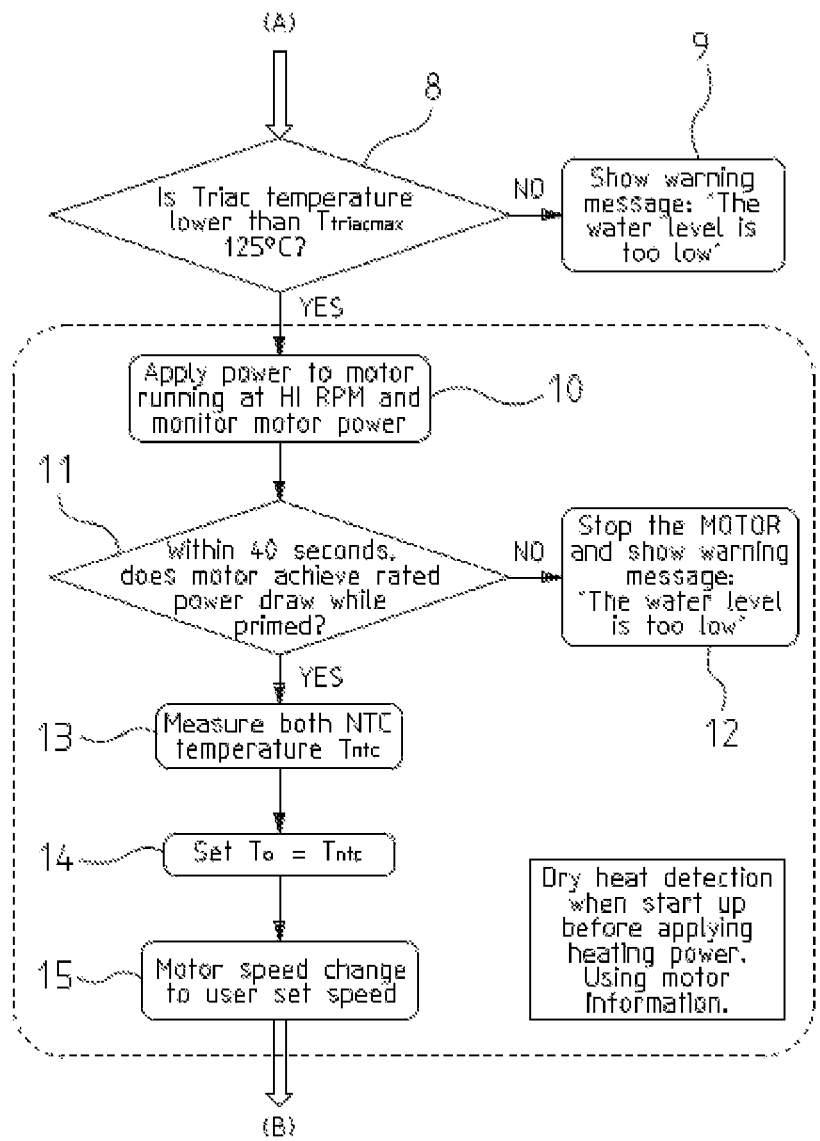
Figure 5C:
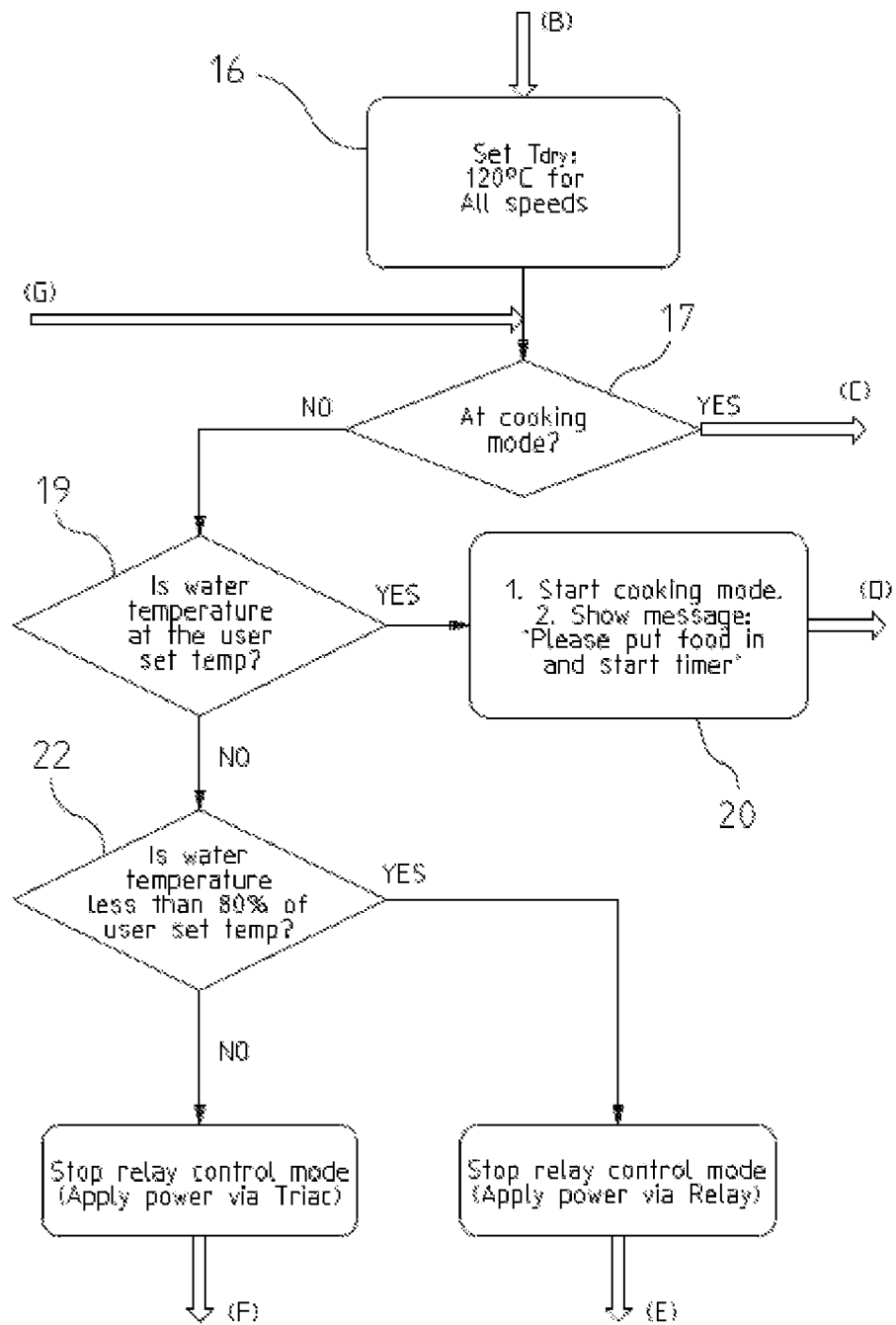
Figure 5D:
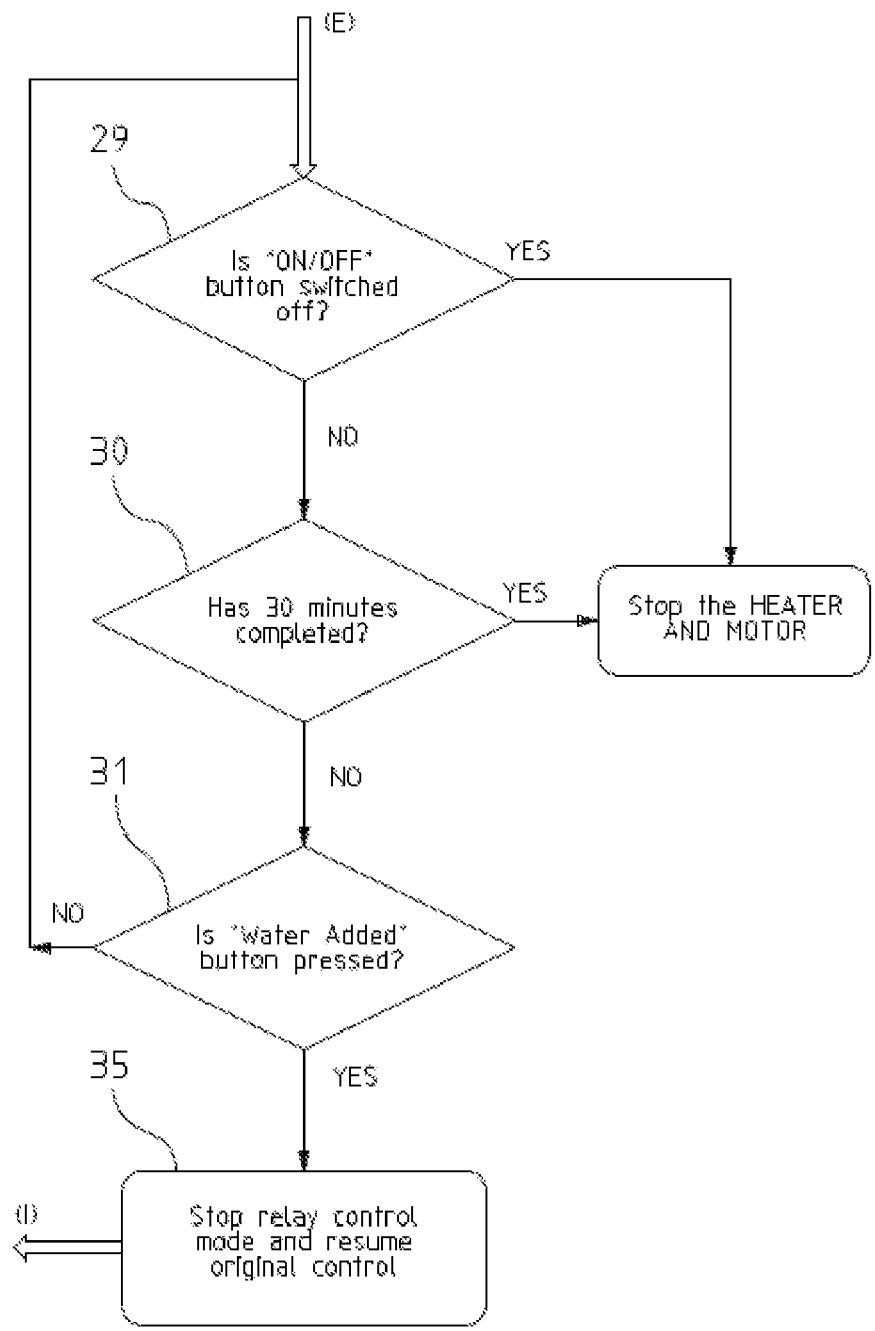
Figure 5E:
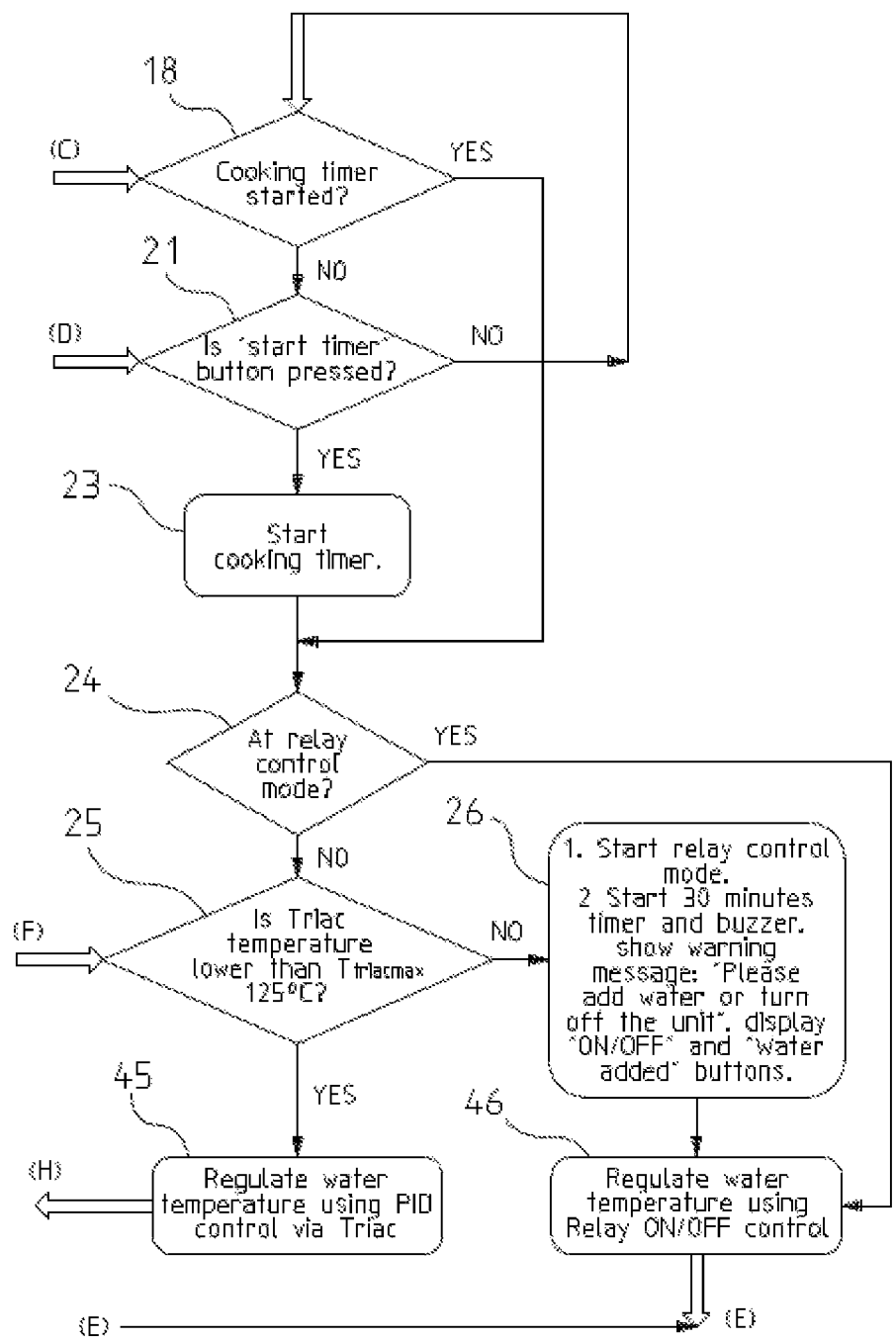
Figure 5F:
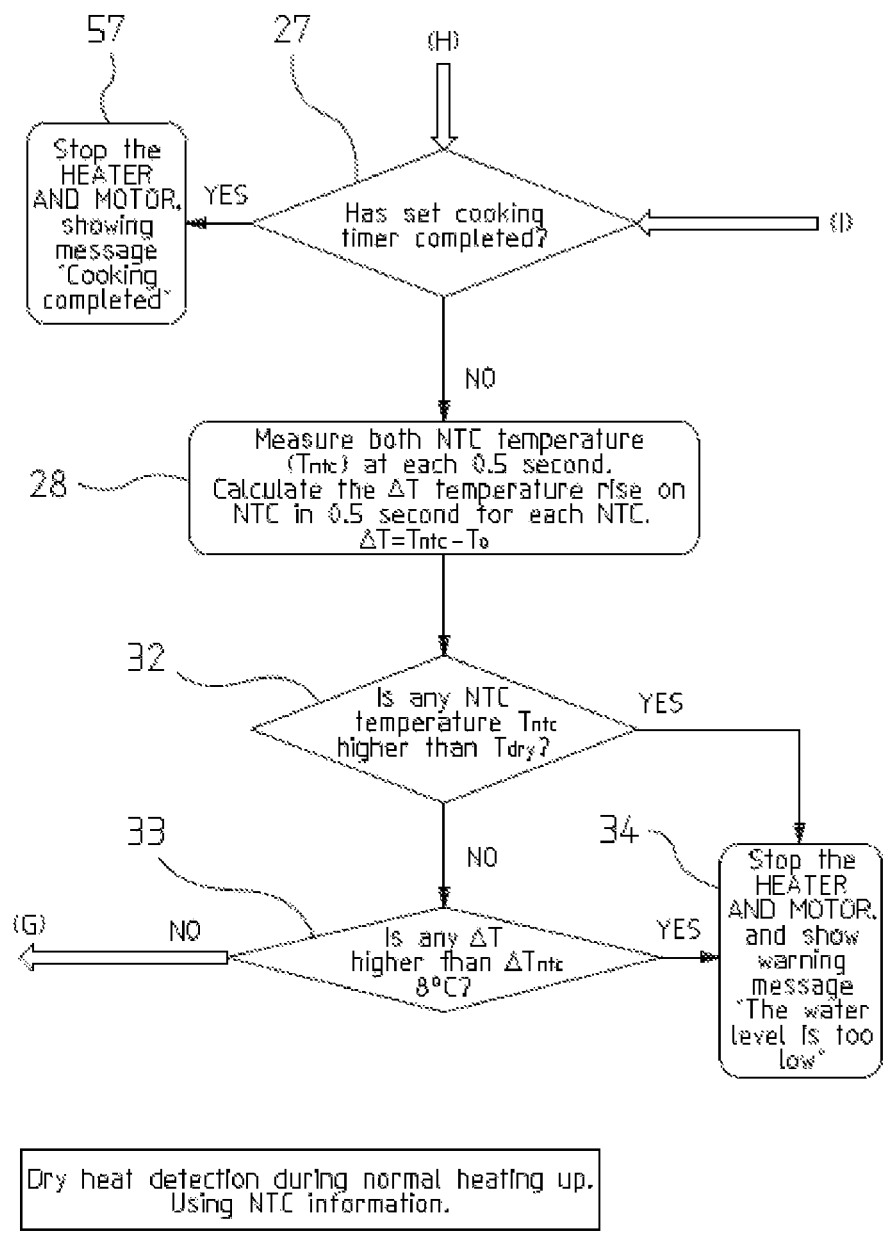

FIGS. 4A and 4B show temperature profile graphs according to an embodiment of the present disclosure.

FIG. 4A shows a temperature (y axis) of a triac (and water) vs time (x axis) of a cooking device being operated in 130 mm of water.

FIG. 4B shows a temperature (y axis) of a triac (and water) vs time (x axis) of a cooking device being operated in 60 mm of water.

As can be seen from FIGS. 4A and 4B, the temperature of the triac in the shallower water is around 5 degrees Celsius higher than the deeper water.

FIGS. 5A-5F show a process flow diagram for controlling an immersion circulator cooking device according to an embodiment of the present disclosure as follows.

At step 1, the immersion circulator cooking device is in standby mode.

At step 2, the user presses a "power on" button on top of the immersion circulator cooking device to start a function of the immersion circulator cooking device.

At step 3, the user may set the temperature, time, motor speed (e.g. low, medium, high) and other variables associated with a cooking operation. Alternatively, a user may choose (i.e. select) a pre-set recipe via the user interface to commence operation of the cooking device.

At step 4, a limiting temperature for two NTC components that are attached (e.g. soldered) to the thin film heater is set in the software to 110° C. It will be understood that this can be adjusted in the software based on the specification of the NTC component. The 110° C. is the "dry" temperature, which, if reached indicates that the heater may be operating without any water running through it. That is, the cooking device may not be located in the bath of water (e.g. it has been knocked out), or the water has run dry over time.

At step 5, the controller makes a determination on whether at least one (or both) of the two heating component NTCs is running at the dry temperature. That is, a determination is made whether at least one (or both) of the two heating component NTCs has a temperature higher than $T_{dry}$=110° C. Two heating components are used on the heater element for the purposes of redundancy to reduce the risk of one NTC failing. The two heating components NTCs are used for redundancy in case one of them fails.

At step 6, if the determination at step 5 is that at least one of the heating component NTCs is greater than 110° C., then a warning message (e.g. "The water level is too low") is displayed on the user interface prompting the user to add more water.

At step 7, if the determination at step 5 is that at least one of the heating component NTCs is not greater than 110° C., the temperature of the Triac is measured by the controller. That is, the Triac NTC temperature $T_{Triac}$ is measured.

At step 8, the controller makes a determination on whether the temperature of the Triac is lower than 125° C. That is, a determination is made as to whether the Triac temperature $T_{Triac}$ is lower than $T_{Triacmax}$ 125° C. The $T_{Triacmax}$ temperature is based on the manufacturer's maximum operating temperature and the software variable can be changed depending on the Triac installed in the cooking device.

At step 9, if the determination at step 8 is that the Triac temperature is larger than 125° C. then a warning message (e.g. "The water level is too low") is displayed on the user interface prompting the user to add more water.

At step 10, if the determination at step 8 is that the Triac temperature is not larger than 125° C., the controller turns the motor on and power is applied to the motor so that it runs at the maximum (High) RPM setting, and the controller monitors the power being drawn from the power supply by the motor.

At step 11, the controller makes a determination on whether the motor achieves a predetermined primed power draw within a defined time period. That is, a determination is made whether the motor is drawing an amount of power (within a defined range) associated with a primed system after a defined period of time. A primed system has a normal amount of fluid that is required to flow through the fluid channels (as controlled by the motor) during normal cooking operation. In one example, the defined time period is 40 seconds for a system in which it normally takes around 30 seconds to prime the system. It will be understood that different time values may be used based on the size of motor, amount of water required to be primed, speed of the motor and other variables. In the case where no (or limited) fluid is flowing through the fluid channels of the cooking device, the motor would operate without a load, thus drawing less power than if a fluid load were present. The determination that less load is present (based on the measured primed power being drawn) can be used to signify that there is no (or limited) load and thus no water (or limited water) is available for the cooking device.

At step 12, if the determination is at step 11 is that the motor does not draw the predetermined power draw (rated power) within the predetermined time period (e.g. 40 seconds), then the controller switches the motor off (i.e. stops the motor) and then a warning message (e.g. "The water level is too low") is displayed on the user interface prompting the user to add more water.

At step 13, if the determination is at step 11 is that the motor does draw the predetermined power draw (rated power) within the predetermined time period, the controller measures the temperature of the two heating component NTCs $T_{ntc}$.

At step 14, the controller sets an initial temperature $T_0$ to be equal to the NTC temperature $T_{ntc}$. This is done for the purpose of finding the gradient temperature over 0.5 second resolution as described in step 28 and is used to monitor the safe operating temperature of the cooking device.

At step 15, the controller adjusts the motor speed so that the motor runs at the user set speed.

At step 16, the controller sets $T_{dry}$ at 120° C. for all motor speeds. This step is an additional operational redundant safety feature. The limits of the temperatures are set low because the heater can heat up in dry conditions to max temperate over a few seconds.

At step 17, the controller makes a determination on whether the cooking device is programmed to be in cooking mode.

At step 18, if at step 17 the controller makes a determination that the cooking device is operating in cooking mode, the controller makes a determination on whether a cooking timer is started.

At step 21, if at step 18 the controller makes a determination that the cooking timer has not started, the controller makes a determination on whether the "start timer" button is pressed. If a positive determination is reached, the process moves to step 23. If a negative determination is reached, the process moves to step 18.

At step 23, the controller activates the timer function (start cooking timer) and the process moves to step 24.

At step 24, following step 23 or, if at step 18 the controller does makes a determination that a cooking timer has started, the controller makes a determination on whether relay control mode is active or not.

At step 25, if the controller makes a determination that the relay control mode is not active, then the controller determines whether the Triac temperature $T_{Triac}$ is lower than $T_{Triacmax}$ 125° C.

At step 45, if the controller determines that the Triac temperature $T_{Triac}$ is lower than $T_{Triacmax}$ 125° C. then the water temperature is regulated in Triac mode using PID control to control operation of the Triac.

At step 27, following step 45, the controller determines whether the cooking timer has completed.

At step 57, if the controller determines that the cooking timer has completed, then the operations stop and the controller causes a message to be displayed indicating that cooking has been completed.

At step 28, if the controller determines that the cooking timer has not yet completed (i.e. the cooking timer is still operating) then the controller measures the gradient temperature by taking the initial value that was set at step 14, with a read value that is read 0.5 seconds from the initial value. The difference calculated gives $\Delta T = T_{ntc} - T0$. That is, the controller measures the heater temperature from the two heater NTCs ($T_{ntc}$) at each 0.5 second, calculates the change in temperature $\Delta T$ temperature rise in 0.5 second for each of the two NTCs as $\Delta T = T_{ntc} - T_0$.

At step 32, after step 28, the controller determines whether either of the heater NTC temperature $T_{ntc}$ is higher than $T_{dry}$, and upon a positive determination, the process moves to step 34.

At step 33, if the controller determines that either of the heater NTC temperature $T_{ntc}$ is not higher than $T_{dry}$, the controller determines whether $\Delta T$ is higher than a predetermined temperature change value (e.g. 8° C.). The $\Delta T$ calculation solves the problem of a user, for example, taking out the sous vide device and the temperature ramping up very quickly because there is no longer any water available for circulation. The $\Delta T$ is generally used to detect a sudden temperature change.

At step 34, if the controller determines that $\Delta T$ is higher than a predetermined temperature change value, then the controller stops the operation of the cooking device and a warning message (e.g. "The water level is too low") is displayed on the user interface prompting the user to add more water. If the controller determines that $\Delta T$ is not higher than a predetermined temperature change value, the process moves to step 17.

At step 19, which occurs following a negative determination at step 17, the controller determines whether the water temperature is at user temperature based on measurements taken from a water temperature NTC. If the controller determines that the water temperature is not at user temperature, the process continues to step 22 (described below).

At step 20, if the controller determines at step 19 that the water temperature is at user temperature, the controller commences cooking operations by starting the cooking mode and displays a suitable message such as "Please put food in and start timer", and the process moves to step 21.

At step 22, if the controller determines that the water temperature is not at user temperature, the controller determines whether the water temperature is less than a defined percentage (for example 80%) of the user set temperature. If the controller reaches a positive determination, then the controller activates relay control mode and the process move to step 29. If the controller reaches a negative determination, the controller deactivates relay control mode and activates Triac control mode, following which the process moves to step 25.

The reason Triac control mode is used when the temperature is above 80% is because it gives finer control when approaching the set temperature point. Relay control mode is described in step 26, which occurs upon the controller reaching a negative determination in step 25.

In step 26, the controller starts relay control mode. The relay is used to cyclically switch power to the heater. The controller starts a timer countdown using a predetermined time period, which in this example is 30 minutes. It will be understood that the timer may be programmed to be any other suitable time value. For example, having the timer set to 30 minutes allows the chef, for example, the ability to manage the kitchen within these 30 minutes and hopefully attend to the cooking device. Once the timer has expired the controller shuts the cooking device down.

At step 29, the controller determines whether an on/off switch has been pressed, and upon a negative decision, the controller stops operation of the cooking device.

At step 30, if at step 29 a negative determination is reached, then the controller determines whether the predetermined time limit (e.g. 30 minutes) has lapsed. Upon a positive determination, the controller stops operation of the cooking device. Upon a negative determination the process proceeds to step 31.

At step 31, the controller determines whether the "water added" button has been pressed. If the determination is negative, the process moves to step 29. If the determination is positive, the controller clears the message "please add water" (see step 26) and the process moves to step 35.

At step 35, the controller stops relay control mode and resumes triac control mode. The process then proceeds to step 27.

FIG. 6 shows an example circuit diagram with a controller 601 for controlling the operation of the cooking device. The two heater NTCs (301A, 301B) are also shown along with the triac NTC 103. Each of the NTCs are in connection with the controller 601 to enable the temperature from each NTC to be monitored, and for the controller to function based on those temperatures.

INDUSTRIAL APPLICABILITY

The arrangements described are applicable to the cooking appliance industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. An immersion circulator cooking device comprising:
a motor for drawing a fluid that is used for cooking past a heating element;
the heating element for heating the fluid;
a first switching device used in a first power mode for controlling the heating element;
a second switching device used in a second power mode for controlling the heating element;
a first switching device temperature sensor positioned structurally on the first switching device for sensing a sensed device temperature of the first switching device;
a controller for selecting which of the first power mode and second power mode is selected based on the sensed device temperature of the first switching device; and
a fluid temperature sensor for sensing sensed fluid temperature of the fluid.

2. The cooking device of claim 1, wherein the first switching device is a solid state switching device.

3. The cooking device of claim 2, where the solid state switching device is a triac.

4. The cooking device of claim 1, wherein the second switching device is a relay.

5. The cooking device of claim 1, wherein the sensed device temperature of the first switching device is associated with one or more of an optimal fluid level, a minimal fluid level and a dry fluid level.

6. The cooking device of claim 5, wherein:
the optimal fluid level is above the first switching device, and
the second switching device switches power to the heating element when the fluid is below the minimal fluid level.

7. The cooking device of claim 1, wherein in the first power mode, the controller is arranged to determine whether the sensed device temperature is below, or not above, a predetermined temperature level, and upon a negative determination, switch from the first power mode to the second power mode, or wherein in the first power mode, the controller is arranged to determine whether the sensed device temperature is above a predetermined temperature level, and upon a positive determination, switch from the first power mode to the second power mode.

8. The cooking device of claim 7, wherein in the second power mode, the controller is arranged to determine whether a predetermined period of time has expired, and upon a positive determination, stop applying power to the heating element.

9. The cooking device of claim 1, wherein the controller is arranged to
switch from the second power mode to the first power mode upon a determination that the sensed fluid temperature is above, or not below, a desired user set temperature,
or the controller is arranged to
switch from the first power mode to the second power mode upon a determination that the sensed fluid temperature is below, or not above, a desired user set temperature.

10. The cooking device of claim 1, further comprising one or more heater temperature sensors for sensing a sensed heater temperature, wherein in the first power mode, the controller is arranged to determine whether the sensed heater temperature is either i) above a maximum temperature or ii) changing over time above a maximum temperature variation and, upon a positive determination, the controller is arranged to switch off the heating element and generate an alarm.

11. The cooking device of claim 1, wherein the controller is arranged to prime the fluid in the cooking device by operating the motor and detecting whether power used to operate the motor after the priming of the fluid is within range of a predetermined primed power level, and upon a negative determination, the control is arranged to stop the motor and generate an alarm.

* * * * *